No. 721,297. PATENTED FEB. 24, 1903.
C. E. GRIFFITH.
CATTLE PUMP.
APPLICATION FILED JULY 26, 1902.
NO MODEL.
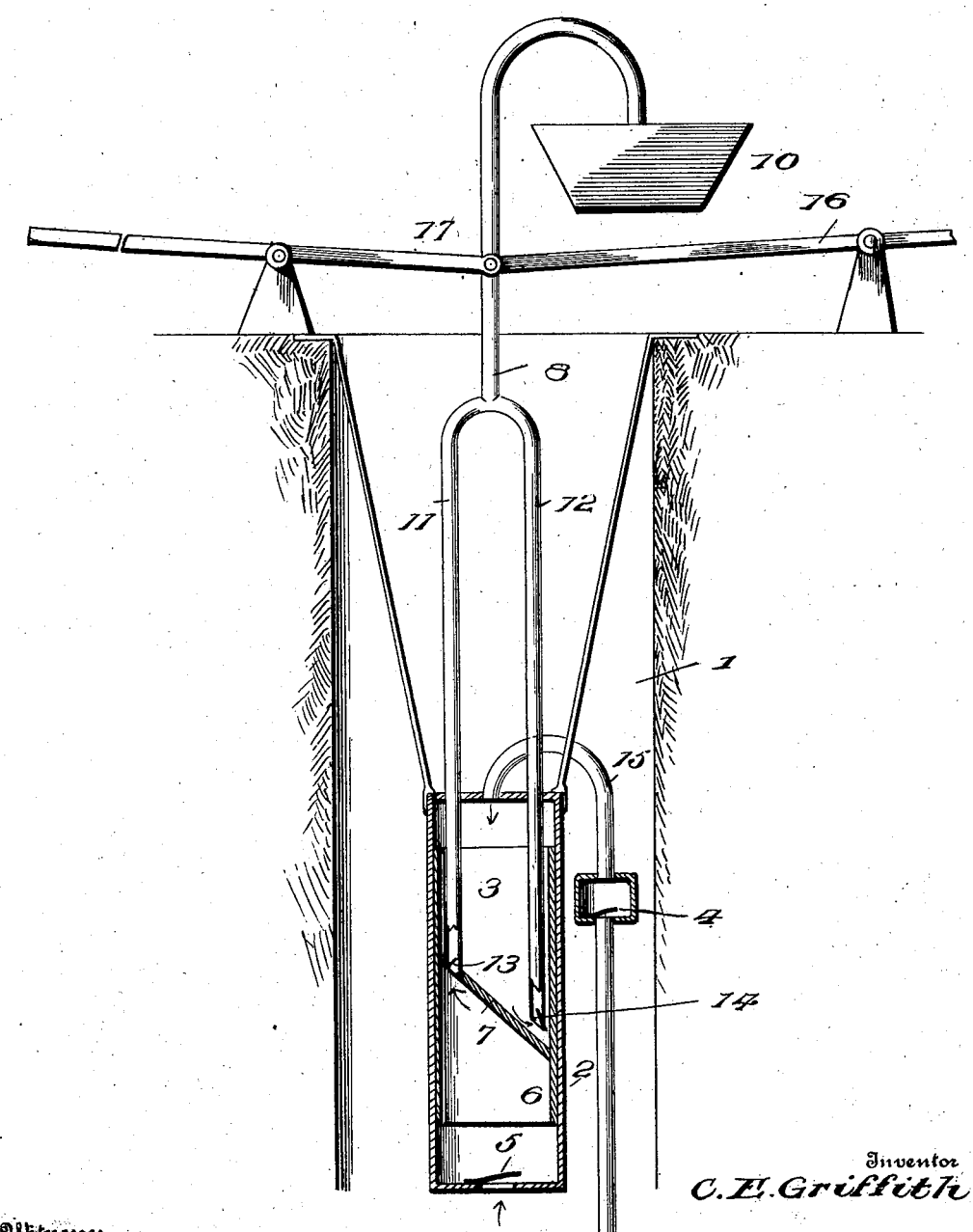
Inventor
C. E. Griffith

UNITED STATES PATENT OFFICE.

CHARLES E. GRIFFITH, OF McCOOK, SOUTH DAKOTA.

CATTLE-PUMP.

SPECIFICATION forming part of Letters Patent No. 721,297, dated February 24, 1903.

Application filed July 26, 1902. Serial No. 117,095. (No model.)

*To all whom it may concern:*

Be it known that I, CHARLES E. GRIFFITH, a citizen of the United States, residing at Mc-Cook, in the county of Union and State of South Dakota, have invented certain new and useful Improvements in Cattle - Pumps, of which the following is a specification.

In stock-yards and on farms in watering stock great inconvenience is experienced in supplying water to the same either by manual power or the like, involving either much time and labor or great expense, especially where the number of head of the cattle or whatever the character or kind of stock may be is very large. The invention hereinafter described has for its object to provide improvements in pumps used for this purpose, depending upon the intelligence of the animal to operate the pump of its own volition, and thereby not necessitating the employment of any human agency, which would be disadvantageous in the respects premised above.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawing, which is a vertical central section of a cattle-pump embodying the essential features of the invention.

Referring to the drawing, 1 indicates the well, 2 is a cylinder fixedly disposed within the well, and 3 a piston for movement within the cylinder 2. The cylinder 2 is of ordinary construction, having upper and lower inlet-openings disposed at opposite ends thereof. The inlet-openings are controlled by valves 4 and 5, also of common form, as found most suitable and serviceable. The piston 3 is of peculiar construction, comprising the cylindrical shell 6, which acts as a guide bearing against the inside of the cylinder, and the diaphragm or piston proper, 7, diagonally disposed intermediate the ends of the shell. The piston-rod 8, actuating the piston, constitutes the discharge-pipe and is curved at its upper end to form the spout. The trough 10 is disposed beneath this spout. The discharge-pipe 8 has branches 11 and 12 at the lower portion thereof, the branch 11 communicating with the space at the lower portion and the branch 12 with that at the upper portion of the cylinder 2 and upon opposite sides of the diagonal diaphragm 7. The branches of the discharge-pipe are hollow and have valves 13 and 14 at their lower inlet-openings. A suction-pipe is connected with the upper inlet-opening of the cylinder 2, the valve 4 being located in this pipe.

The piston-rod is reciprocated by platforms 16 and 17, connected to the same at a point approximately below the spout thereon. These platforms are fulcrumed, and thereby adapted to be moved up and down by the weight of the animal traversing them. The trough is so disposed that it does not impede the progress of the animal passing over the platforms, which may be fulcrumed at any point, according as expedient.

The form of diaphragm shown upon the piston concentrates the rush of water upon the ascension and descension of the piston toward the valve-openings, and for this reason a greater force is obtained, which is greatly advantageous, especially in this species of pumps. The animal stepping upon the platform 16 forces the inner end thereof downward by its weight, the piston descends, and, the valve 5 closing, the water in the lower portion of the cylinder passes up through the valve and branch 11 of the delivery-pipe into the trough. The animal after drinking moves upon the platform 17 and steps off. It will be seen that this causes the piston to move upward and the water which filled the upper portion of the cylinder having been drawn through the suction-pipe 15 on the downstroke of the piston is forced through the valve 14 to the trough, passing up through the branch 12 of the discharge-pipe. The trough is thus kept full at all times, as will be readily noted. Railings may be placed along the sides of the platform, so that the animal will pass over the entire length thereof. I do not limit myself to the exact structure as shown in the drawing, but may change the details in accordance with the spirit of the invention and as covered by the claims.

Having thus described the invention, what is claimed as new is—

1. In a pump of the character described, a cylinder having a valved inlet at its lower end and a valved suction-pipe connected with an inlet-opening in the other end, a piston diagonally arranged within the cylinder, discharge-pipes having openings in their lower extremities communicating with opposite sides of the piston, and valves arranged in said openings and approximately in line therewith, and means for reciprocating the piston, substantially as described.

2. In a pump of the character described, a cylinder having a valved inlet-opening in the lower side thereof, a valved suction-pipe connected with an inlet-opening in the opposite side of the cylinder, a diagonally-disposed piston within the cylinder, a cylindrical shell comprising a guide surrounding the piston, a branched discharge-pipe constituting a piston-rod, one of the branches of said pipe communicating with the under side of the piston and the other with the upper side thereof, valves located approximately at the points of communication aforementioned, fulcrumed platforms connected at one end to the discharge-pipe and adapted to reciprocate same, substantially as set forth.

In testimony whereof I affix my signature in presence of two witnesses.

CHARLES E. GRIFFITH. [L. S.]

Witnesses:
GEO. JEPSON,
ANNIE S. V. GUSTAFSSON.